(12) United States Patent
Odagaki et al.

(10) Patent No.: US 11,290,627 B2
(45) Date of Patent: Mar. 29, 2022

(54) LIGHTING DEVICE AND FLEXIBLE SUBSTRATE CONNECTING LIGHT EMITTING PORTION THEREOF

(71) Applicant: CANON KABUSHIKI KAISHA, Tokyo (JP)

(72) Inventors: Koichi Odagaki, Kawasaki (JP); Jiro Yamamoto, Chofu (JP); Katsuhiro Doshin, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 164 days.

(21) Appl. No.: 16/732,485

(22) Filed: Jan. 2, 2020

(65) Prior Publication Data
US 2020/0228687 A1  Jul. 16, 2020

(30) Foreign Application Priority Data

Jan. 10, 2019 (JP) .............................. JP2019-002704

(51) Int. Cl.
*F21V 23/00* (2015.01)
*H05B 41/36* (2006.01)
(Continued)

(52) U.S. Cl.
CPC ........... *H04N 5/2256* (2013.01); *F21V 14/02* (2013.01); *F21V 23/002* (2013.01); *H05B 41/02* (2013.01); *H05B 41/36* (2013.01); *F21S 10/06* (2013.01)

(58) Field of Classification Search
CPC ........ F21S 10/06; F21V 14/02; F21V 23/002; G03B 15/05; G03B 2215/0503;
(Continued)

(56) References Cited

U.S. PATENT DOCUMENTS

| 7,312,401 B2 | 12/2007 | Tsukada et al. |
| 7,786,389 B2 | 8/2010 | Tsukada et al. |

(Continued)

FOREIGN PATENT DOCUMENTS

| CN | 1467558 A | 1/2004 |
| CN | 1577043 A | 2/2005 |

(Continued)

OTHER PUBLICATIONS

Jul. 2, 2021 Chinese Official Action in Chinese Patent Appln. No. 202010017777.4.

(Continued)

*Primary Examiner* — Renan Luque
(74) *Attorney, Agent, or Firm* — Venable LLP

(57) ABSTRACT

A lighting device that can prevent the progress of minute cracks generated in a flexible substrate or the occurrence of minute cracks themselves, and the flexible substrate. A flexible substrate, that electrically connect a light emitting portion movable relative to a main body portion of the lighting device, has a soldering portion that is soldered to the light emitting portion at one end, a connection portion that is connected to the light emission control portion at another end, a communication portion that connects the soldering portion and the connection portion, and two xenon wires and two trigger wires that are arranged in the communication portion in a longitudinal direction. In the communication portion, of the four wires, the two xenon wires are arranged between the two trigger wires.

14 Claims, 7 Drawing Sheets

(51) Int. Cl.
*H05B 41/02* (2006.01)
*F21S 10/06* (2006.01)
*H04N 5/225* (2006.01)
*F21V 14/02* (2006.01)

(58) Field of Classification Search
CPC .... G03B 2215/0507; G03B 2215/0521; G03B 2215/0578; G03B 2215/0582; G03B 2215/0592; G03B 2217/007; G03B 2219/045; H04N 5/2254; H04N 5/2256; H04N 5/2354; H04N 5/335; H05B 41/02; H05B 41/36; H05K 1/0256; H05K 1/0393; H05K 1/147; H05K 1/148; H05K 1/18; H05K 1/182; H05K 1/189; H05K 2201/0129; H05K 2201/0145; H05K 2201/0154; H05K 2201/0195; H05K 2201/055; H05K 2201/10121; H05K 5/0247; H05K 5/06

See application file for complete search history.

(56) References Cited

U.S. PATENT DOCUMENTS

| | | | |
|---|---|---|---|
| 8,249,442 B2 * | 8/2012 | Yasuda | G03B 17/14 396/176 |
| 8,367,936 B2 | 2/2013 | Su et al. | |
| 9,560,251 B2 | 1/2017 | Doshin | |
| 10,091,400 B2 | 10/2018 | Yamamoto et al. | |
| 10,200,576 B2 | 2/2019 | Yamamoto et al. | |
| 10,773,659 B2 | 9/2020 | Nakamura | |
| 2006/0068613 A1 | 3/2006 | Tsukada et al. | |
| 2008/0115963 A1 | 5/2008 | Tsukada et al. | |
| 2011/0067905 A1 | 3/2011 | Su et al. | |
| 2014/0217397 A1 | 8/2014 | Kwak et al. | |
| 2016/0072992 A1 * | 3/2016 | Doshin | H04N 5/2256 348/371 |
| 2017/0005424 A1 * | 1/2017 | Lee | H01R 12/775 |
| 2017/0224203 A1 | 8/2017 | Tanahashi | |
| 2018/0255639 A1 * | 9/2018 | Bergman | D03D 1/0082 |
| 2019/0069413 A1 * | 2/2019 | Kasugai | H05K 1/189 |
| 2019/0071028 A1 | 3/2019 | Nakamura | |

FOREIGN PATENT DOCUMENTS

| | | |
|---|---|---|
| CN | 101023716 A | 8/2007 |
| CN | 201726596 U | 1/2011 |
| CN | 102026475 A | 4/2011 |
| CN | 207603986 U | 7/2018 |
| CN | 108702436 A | 10/2018 |
| JP | H08-184883 A | 7/1996 |
| JP | 2002-171033 A | 6/2002 |
| JP | 2016-018787 A | 2/2016 |

OTHER PUBLICATIONS

Dec. 8, 2020 Japanese Official Action in Japanese Patent Appln. No. 2019-002704.

* cited by examiner

LIGHTING DEVICE AND FLEXIBLE SUBSTRATE CONNECTING LIGHT EMITTING PORTION THEREOF

BACKGROUND OF THE INVENTION

Field of the Invention

The present invention relates to a lighting device and a flexible substrate connecting a light emitting portion thereof.

Description of the Related Art

There is conventionally known a lighting device configured so that the relative position of a strobe light emitting portion can be changed with respect to a main body. In such a lighting device, in order to make a necessary electrical connection between the main body and the strobe light emitting portion, a flexible substrate is used to connect the electronic component of the main body and the electronic component of the strobe light emitting portion side. The flexible substrate undergoes predetermined deformation in accordance with the change in the position of the strobe light emitting portion, whereby the electrical connection between the lighting device main body and the strobe light emitting portion is maintained.

Japanese Laid-Open Patent Publication (kokai) No. H08-184883 discloses a camera with a built-in strobe as a lighting device that electrically connects a main body thereof and a strobe light emitting portion via a flexible substrate. The main body of the camera includes a rotatable arm, a strobe light emitting portion carried by the arm, a flexible substrate connected to the strobe light emitting portion, an in-body flexible substrate connected to a main body control circuit, and a floor plate integrally formed with the arm. Further, the strobe light emitting portion is configured to protrude from the storage position to the light emitting position when the arm rotates. The flexible substrate connected to the strobe light emitting portion is connected to the in-body flexible substrate in the main body through a first hole provided in the floor plate and a second hole provided in an outer peripheral portion of the main body, for the purposes of supplying power and transmitting signals to the internal electrical components of the strobe light emitting portion. In addition, the flexible substrate is disposed with a slack inside the main body in the storage position.

However, in Japanese Laid-Open Patent Publication (kokai) No. H08-184883, it is not considered that minute cracks may be generated in wired patterns at both ends of the flexible substrate by repeatedly causing predetermined deformation to the flexible substrate by the rotating arm. It should be noted that only the generation of such minute cracks causes no problem in the necessary electrical connection between the lighting device main body and the strobe light emitting portion. However, the cracks may progress due to the temperature rise in the wired patterns at the both ends of the conventional flexible substrate in which a relatively large current flows. In such a case, there causes a problem that the wired patterns on the flexible substrate are disconnected, the necessary electrical connection between the lighting device main body and the strobe light emitting portion becomes failed, and the strobe no longer emits light.

That is, according to the technique described in Japanese Laid-Open Patent Publication (kokai) No. H08-184883, when the strobe light emitting portion protrudes toward the light emitting position, the slack in the flexible substrate is absorbed to prevent the flexible substrate from being overstrained. However, the progress and occurrence of such minute cracks cannot be prevented.

SUMMARY OF THE INVENTION

The present invention provides a lighting device that can prevent the progress of minute cracks generated in a flexible substrate or the occurrence of minute cracks themselves, and the flexible substrate.

In a first aspect of the present invention, a lighting device, comprising a main body portion, a light emitting portion movable relative to the main body portion, a light emission control portion provided in the main body portion, and a flexible substrate configured to electrically connect the light emitting portion and the light emission control portion, wherein the light emitting portion has a xenon tube and a light emission control coil, wherein the flexible substrate has a soldering portion that is soldered to the light emitting portion at one end, a connection portion that is connected to the light emission control portion at another end, a communication portion that connects the soldering portion and the connection portion, and four wires that are arranged in the communication portion in a longitudinal direction, wherein the light emitting portion includes two xenon terminals that are connected to both ends of the xenon tube, and two light emission control terminals that are connected to the light emission control coil, wherein the four wires are electrically connected by soldering to different terminals of the two xenon terminals and the two light emission control terminals in the soldering portion, and wherein, in the communication portion, of the four wires, two second wires electrically connected to different terminals of the two xenon terminals are arranged between, of the four wires, two first wires electrically connected to different terminals of the two light emission control terminals.

In a second aspect of the present invention, a lighting device, comprising a main body portion, a light emitting portion movable relative to the main body portion, a light emission control portion provided in the main body portion, and a flexible substrate configured to electrically connect the light emitting portion and the light emission control portion, wherein the flexible substrate has a soldering portion that is soldered to the light emitting portion at one end, a connection portion that is connected to the light emission control portion at another end, and a communication portion that connects the soldering portion and the connection portion and around which an insulating tape is wound in a short-side direction, and wherein the insulating tape has an extension portion that extends to the soldering portion when being wound around the communication portion.

In a third aspect of the present invention, a flexible substrate, comprising a soldering portion that is soldered to a light emitting portion at one end, a connection portion that is connected to a light emission control portion at another end, a communication portion that connects the soldering portion and the connection portion, and four wires that are arranged in the communication portion in a longitudinal direction, wherein the four wires are electrically connected by soldering to different terminals of two xenon terminals and two light emission control terminals in the soldering portion, and wherein, in the communication portion, of the four wires, two second wires electrically connected to different terminals of the two xenon terminals are arranged between, of the four wires, two first wires electrically connected to different terminals of the two light emission control terminals.

In a fourth aspect of the present invention, a flexible substrate, comprising a soldering portion that is soldered to a light emitting portion at one end, a connection portion that is connected to a light emission control portion at another end, and a communication portion that connects the soldering portion and the connection portion and around which an insulating tape is wound in a short-side direction thereof, wherein the insulating tape has an extension portion that extends to the soldering portion when being wound around the communication portion.

According to the present invention, it is possible to prevent the progress of minute cracks generated in a flexible substrate or the occurrence of minute cracks themselves.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof

First Embodiment

Hereinafter, a first embodiment of the present invention will be described with reference to the drawings.

Figure 1A:
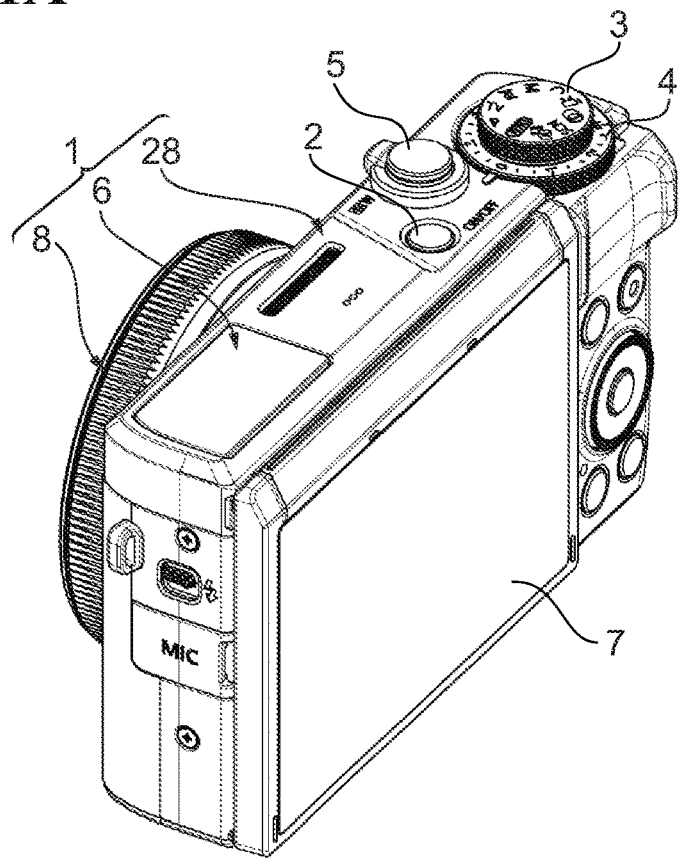
FIG. 1A is a back perspective view of a digital camera as a lighting device according to a first embodiment of the present invention where a strobe light emitting portion is in a stored state.
Figure 1B:
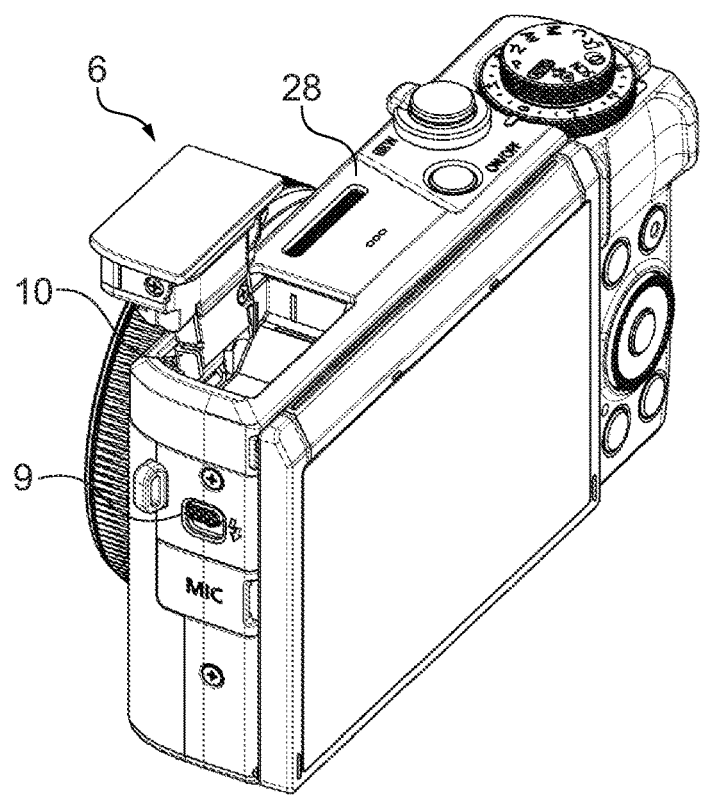
FIG. 1B is a back perspective view of the digital camera where the strobe light emitting portion is in a protruding state.

FIGS. 1A and 1B are back perspective views of a digital camera 1 as a lighting device according to the first embodiment. Specifically, FIG. 1A is a back perspective view of the digital camera 1 in which a strobe light emitting portion 6 is in a stored state, and FIG. 1B is a back perspective view of the digital camera 1 in which the strobe light emitting portion 6 is in a protruding state.

As shown in FIG. 1A, the digital camera 1 has on the upper surface of a main body portion 28, a power switch 2, a mode dial 3, an exposure correction dial 4, and a shutter switch 5, which are operation members for the user to operate the digital camera 1. The digital camera 1 also has a strobe light emitting portion 6 disposed on the upper surface of the main body portion 28.

The digital camera 1 has a display panel 7 and a plurality of operation members for operating the digital camera 1 arranged on a back surface of the main body portion 28.

The digital camera 1 includes a taking lens 8 on the front side of the main body portion 28. The digital camera 1 forms a subject image having passed through the taking lens 8 on an internal image pickup device (not shown), and converts the formed image into an electric signal. Then, the digital camera 1 processes the electric signal in an internal system circuit (not shown) to display the subject image on the display panel 7.

FIG. 1B is a back perspective view of a state in which the strobe light emitting portion 6 is protruded from the main body portion 28 to a protrusion position.

The strobe light emitting portion 6 provided in the digital camera 1 has two states: a storage state where the strobe light emitting portion 6 is stored in the main body portion 28 as shown in FIG. 1A and a protruding state where the strobe light emitting portion 6 protrudes from the main body portion 28 as shown in FIG. 1B. When a release lever 9 on the left side of the digital camera 1 in FIG. 1B is operated in the stored state of the strobe light emitting portion 6, the lock (not shown) of the strobe light emitting portion 6 is released. As a result of this release, a swivel arm 10 is biased by a biasing spring 11 and a biasing spring 27 (see FIG. 2B) to move the strobe light emitting portion 6 to the protruding position, and the strobe light emitting portion 6 is held in the state by the action of the biasing spring 11 and the biasing spring 27. Moving the strobe light emitting portion 6 to the protruding position allows a Fresnel cover 13 (see FIG. 2B) of the strobe light emitting portion 6 to be exposed from the main body portion 28, thereby to deliver strobe light to a subject.

Figure 2A:
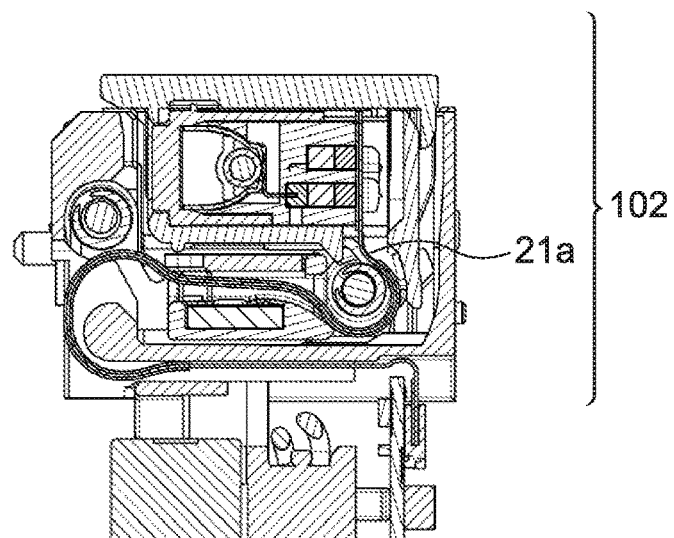
FIG. 2A is a cross-sectional view of the strobe light emitting portion unit shown in FIG. 1 in which the strobe light emitting portion is in the stored state.
Figure 2B:
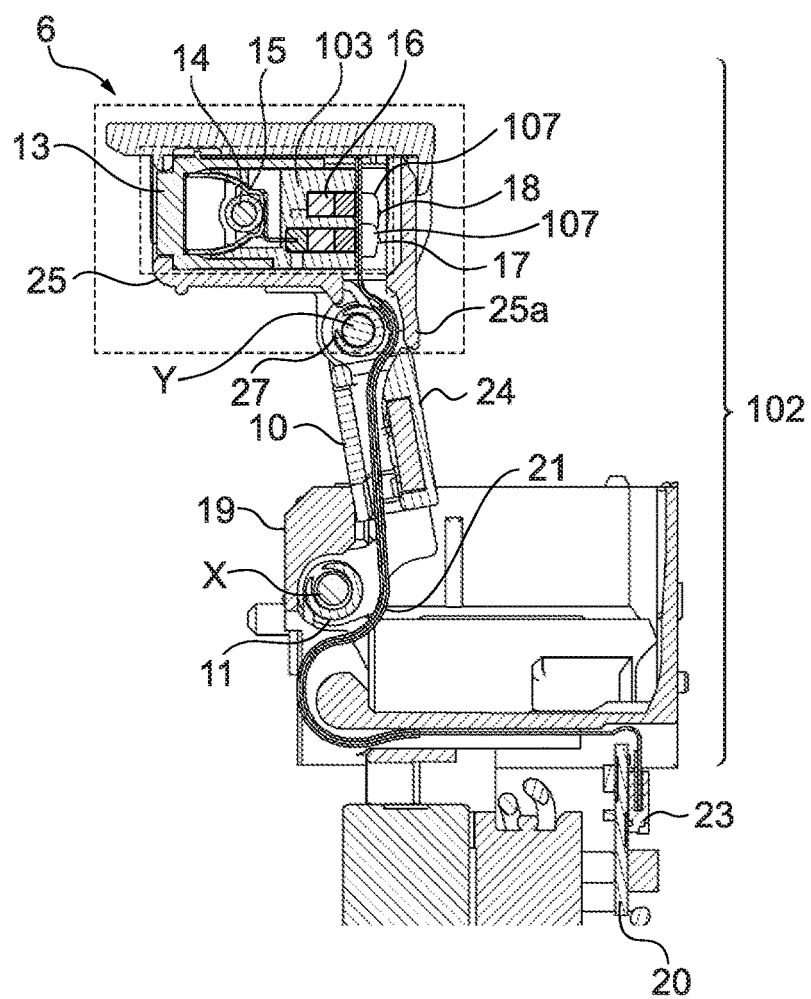
FIG. 2B is a cross-sectional view of the strobe light emitting portion unit in which the strobe light emitting portion is in the protruding state.
Figure 3A:
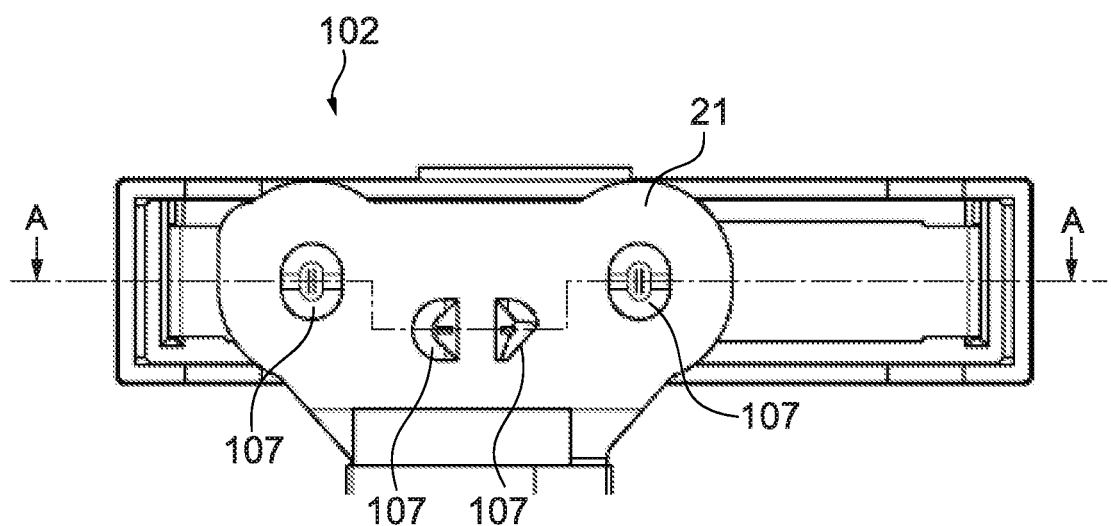
FIG. 3A is a back view of the strobe light emitting portion unit with a flexible substrate shown in FIG. 2B soldered thereto.
Figure 3B:
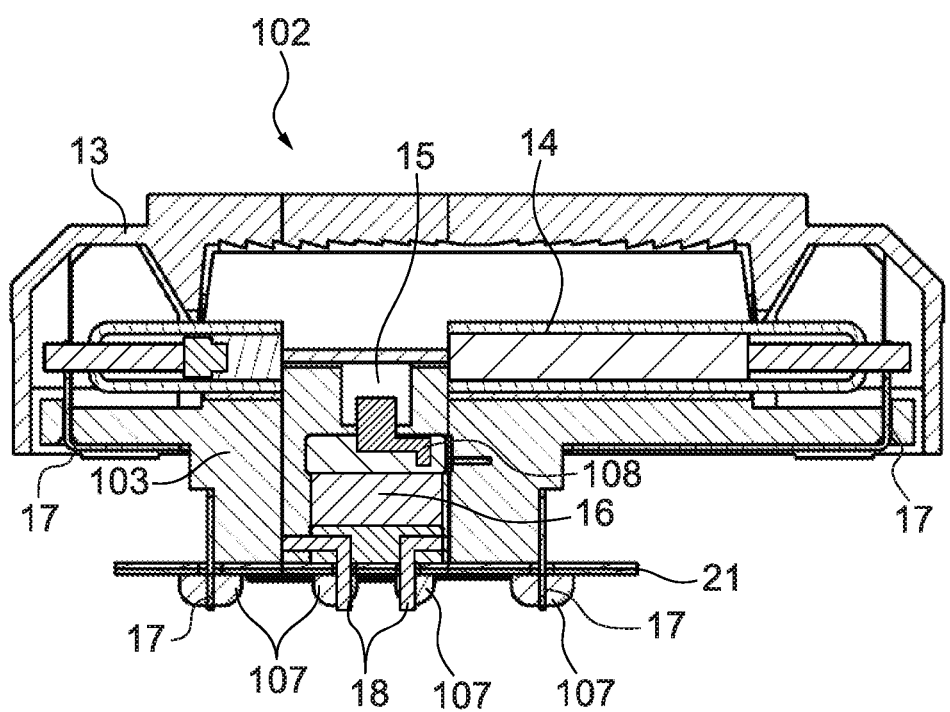
FIG. 3B is a cross-sectional view of a cross section A-A of FIG. 3A.

FIG. 2A is a cross-sectional view of a strobe light emitting portion unit 102 when the strobe light emitting portion 6 is in the stored state, and FIG. 2B is a cross-sectional view of the strobe light emitting portion unit 102 when the strobe light emitting portion 6 is in the protruding state. FIG. 3A is a back view of the strobe light emitting portion unit 102 with a flexible substrate 21 soldered thereto by solder 107. FIG. 3B is a cross-sectional view of a cross section A-A of FIG. 3A.

As shown in FIGS. 2A and 2B, the strobe light emitting portion unit 102 includes the strobe light emitting portion 6, the swivel arm 10, the biasing spring 11, the flexible substrate 21, a decorative cover 24, a strobe holder 25, a rib 25a, and the biasing spring 27.

The strobe light emitting portion 6 includes the Fresnel cover 13 having a Fresnel lens on the front side of the digital camera 1, a xenon tube 14, a reflector 15, a trigger coil (light emission control coil) 16, and a strobe light emitting portion base 103. There are xenon terminals 17 to be connected to the xenon tube 14 and trigger input terminals 18 (light emission control terminals) of the trigger coil 16 that protrude as connection terminals from the back side of the strobe light emitting portion base 103. Further, there is a trigger output terminal 108 (FIG. 3B) that protrudes from the trigger coil 16 and is in contact with the reflector 15.

As shown in FIG. 3B, the xenon tube 14 is elongated in the horizontal direction in FIG. 3B, and the trigger coil 16 is arranged behind the xenon tube 14 near the center as seen in the longitudinal direction of the xenon tube 14. The two xenon terminals 17 are connected to both ends of the xenon tube 14 as seen in the longitudinal direction, and the two trigger input terminals 18 are connected to the trigger coil 16. Since the strobe light emitting portion 6 is configured as described above, the two trigger input terminals 18 are disposed between the two xenon terminals 17 when viewed from the short side of a communication portion 106 (see FIG. 4A).

A strobe substrate 20 (light emission control portion) for controlling strobe light emission is placed on a base 19 (FIG. 2B) of the main body portion 28 in the digital camera 1. The flexible substrate 21 is used for electrical connection between the strobe substrate 20 and the xenon terminals 17 and the trigger input terminals 18. Solder connection lands 22 (see FIG. 5) are disposed on a soldering portion 104 (see FIG. 4A) at one end of the xenon terminals 17, the trigger input terminals 18, and the flexible substrate 21 and are soldered by the solder 107. Further, a connector connection portion 105 (see FIG. 4A) is disposed at the other end of the flexible substrate 21 and is connected to the strobe substrate 20 via a connector 23 to be provided on the main body portion 28 of the digital camera 1.

The swivel arm 10 of the strobe light emitting portion unit 102 is pivotally supported by a shaft X, and the base 19 and the swivel arm 10 are biased in the opening direction by the biasing force of the biasing spring 11. The strobe light emitting portion 6 and the swivel arm 10 are pivotally supported by a shaft Y so that the strobe light emitting portion 6 and the swivel arm 10 are biased in the opening direction by the biasing force of the biasing spring 27. That is, the strobe light emitting portion 6 is pivotally supported by the main body portion 28 of the digital camera 1 via the swivel arm 10 on the two axes (shaft X and shaft Y), and is biased to the protruding position shown in FIG. 2B. When the upper surface of the strobe light emitting portion 6 biased in such a manner is pushed by hand against the biasing force of the biasing spring 11 and the biasing spring 27, the axes X and Y shown in FIG. 2B swivel in the direction opposite to the biasing force of the biasing springs 11 and 27 so that the strobe light emitting portion 6 is stored in the main body portion 28 of the digital camera 1. Thereafter, the strobe light emitting portion 6 is locked at the stored position shown in FIG. 2A.

The decorative cover 24 is attached to the swivel arm 10, and the flexible substrate 21 is disposed in a region between the swivel arm 10 and the decorative cover 24. The strobe holder 25 that holds the strobe light emitting portion 6 has a rib 25a continuous with the decorative cover 24.

The decorative cover 24 and the rib 25a of the strobe holder 25 are configured to prevent a photographer from touching the flexible substrate 21 by mistake to deform or cut the same.

Further, there is a sufficient gap between the shaft Y and the rib 25a so that the flexible substrate 21 is not hindered from moving. When the strobe light emitting portion 6 changes from the stored state to the protruding state, or from the protruding state to the stored state, the flexible substrate 21 moves in the front-back direction of the digital camera 1 within the gap. On the other hand, the flexible substrate 21 is fixed by soldering at the soldering portion 104 (FIG. 4A), and thus bending stress is repeatedly applied to a bending portion 21a in a region between the soldering portion 104 and the portion of the flexible substrate 21 moving in the front-back direction of the digital camera 1. That is, as shown in FIG. 2A and FIG. 4A referred to later, when the flexible substrate 21 shifts to the stored state or the protruding state, the bending portion 21a takes a bending action.

Figure 4A:
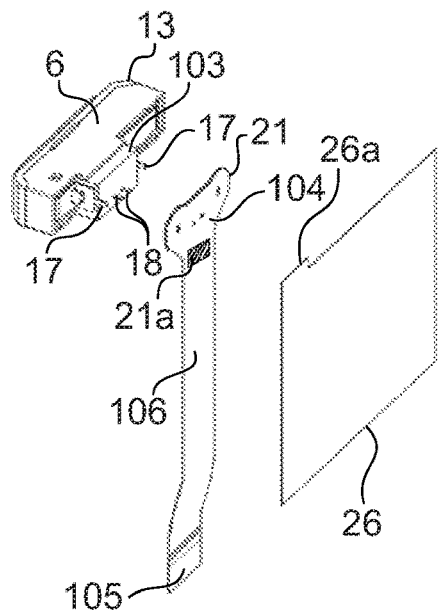
FIG. 4A is an exploded perspective view of the strobe light emitting portion and the flexible substrate viewed from the back side.
Figure 4B:
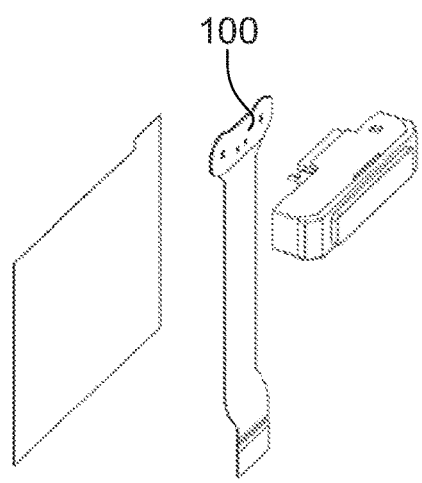
FIG. 4B is an exploded perspective view of the strobe light emitting portion and the flexible substrate viewed from the front side.
Figure 4C:
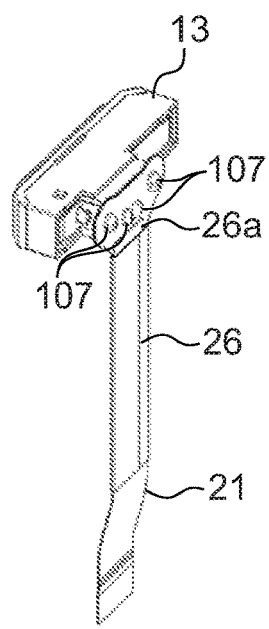
FIG. 4C is a perspective view of an assembled state in which xenon terminals and trigger input terminals shown in FIG. 4A are soldered to the flexible substrate at a soldering portion.

FIG. 4A is an exploded perspective view of the strobe light emitting portion 6 and the flexible substrate 21 as viewed from the back side, and FIG. 4B is an exploded perspective view of the strobe light emitting portion 6 and the flexible substrate 21 as viewed from the front side. FIG. 4C is a perspective view of an assembled state in which the xenon terminals 17 and the trigger input terminals 18 are soldered to the flexible substrate 21 at the soldering portion 104.

As shown in FIG. 4A, the flexible substrate 21 has the soldering portion 104 where the solder connection lands 22 (FIG. 5) are arranged and the connector connection portion 105 connected to the connector 23 (FIG. 2B). The flexible substrate 21 has the communication portion 106 between the soldering portion 104 and the connector connection portion 105. That is, the flexible substrate 21 is formed from three regions, that is, the soldering portion 104, the connector connection portion 105, and the communication portion 106. A plate-like reinforcement plate 100 (FIG. 4B: reinforcement member) is attached to the soldering portion 104 in order to increase the strength of the soldering portion 104 and improve the soldering workability.

Figure 5:
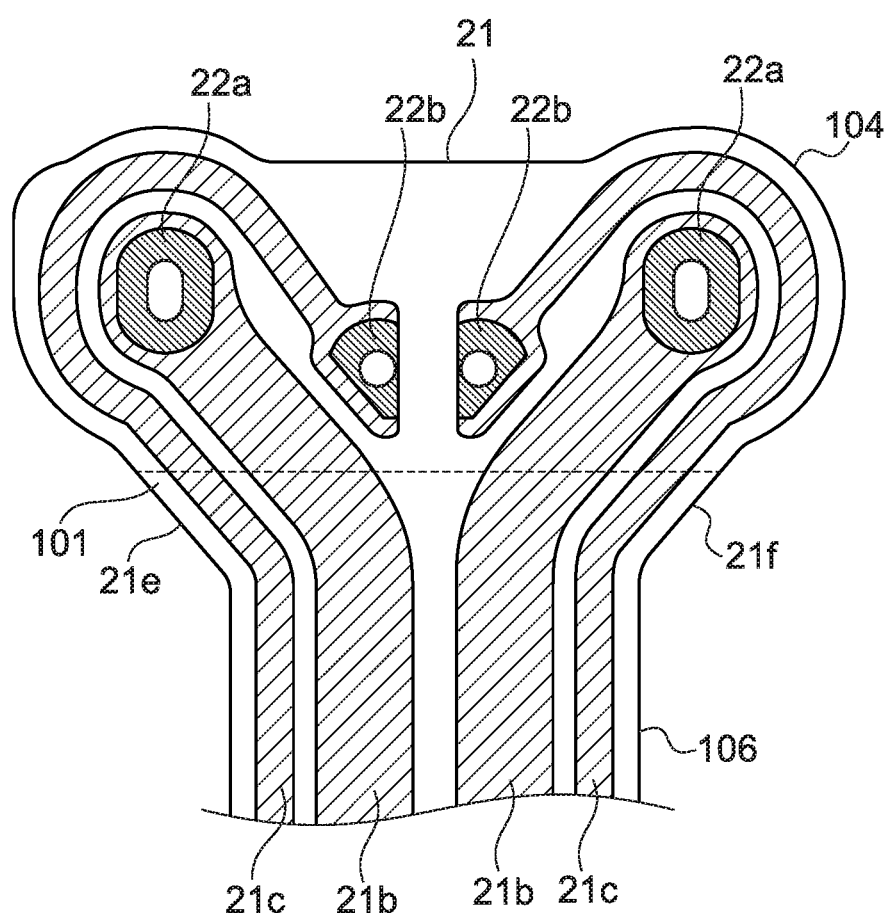
FIG. 5 is a schematic diagram of wired patterns around the soldering portion of the flexible substrate.

FIG. 5 is a schematic diagram of wired patterns around the soldering portion 104 of the flexible substrate 21.

Referring to FIG. 5, two xenon wires 21b are provided on the flexible substrate 21 in the longitudinal direction, which are wires to join solder connection lands 22a connected to the xenon terminals 17. In addition, two trigger wires 21c are provided on the flexible substrate 21 in the longitudinal direction like the xenon wires 21b, which are wires to join solder connection lands 22b connected to the trigger input terminals 18. A broken line 101 schematically shows a boundary with the communication portion 106 of the reinforcement plate 100.

The xenon wires 21b and the trigger wires 21c are formed of copper in the first embodiment. The xenon wires 21b and the trigger wires 21c are covered with a coverlay film (not shown). FIG. 5 shows the solder connection lands 22 at the four places where the coverlay film is removed and the wires are exposed to allow soldering.

As described above, the two trigger input terminals 18 are disposed between the two xenon terminals 17. Therefore, forming the xenon wires 21b and the trigger wires 21c such that the wire lengths of the wired patterns become short from the solder connection lands 22 to the communication portion 106 makes it possible to arrange the two trigger wires 21c between the two xenon wires 21*b* at the passage through the broken line 101. However, in the first embodiment, the wires are replaced in a region where the reinforcement plate 100 (FIG. 4B) of the flexible substrate 21 is attached so that the two xenon wires 21*b* are arranged between the two trigger wires 21*c* at the passage through the broken line 101. Then, the two xenon wires 21*b* are arranged between the two trigger wires 21*c* in the entire communication portion 106.

In addition, the outer shape of the flexible substrate 21 includes connection shapes 21e and 21f that continuously connect the soldering portion 104 and the communication portion 106. The width of the flexible substrate 21 continuously changes from the soldering portion 104 to the communication portion 106 in the presence of the connection shapes 21e and 21f.

Upon receipt of a strobe light emission instruction from a system circuit (not shown) of the main body portion 28, the strobe substrate 20 (FIG. 2B) flows a current for generating a trigger voltage from an element mounted on the strobe substrate 20 via the connector 23 to the trigger wires 21*c* in the flexible substrate 21. When this current is supplied to the trigger coil 16 via the trigger input terminals 18, the trigger coil 16 instantaneously generates a trigger voltage that is a high voltage. This trigger voltage is transmitted to the reflector 15 connected to the trigger output terminal 108 (FIG. 3B). When the trigger voltage is applied to the reflector 15, the xenon gas in the xenon tube 14 is ionized so that the resistance value in the xenon tube 14 rapidly decreases. When the charge accumulated in a main capacitor (not shown) connected to the strobe substrate 20 is applied to both ends of the xenon tube 14 via the xenon wires 21*b* in the flexible substrate 21, the abrupt decrease in the resistance value described above would flow a large current into the xenon tube 14. As a result, the xenon tube 14 emits light. At that time, a large current flows into the xenon wires 21*b*. In this series of strobe light emission operations, the current flowing through the xenon wires 21*b* is larger than the current flowing through the trigger wires 21*c*. Therefore, as shown in FIG. 5, the pattern width of the xenon wires 21*b* is made larger than the pattern width of the trigger wires 21*c*.

In the process of repeated operations of the strobe light emitting portion 6 for the stored state and the protruding state, the flexible substrate 21 is repeatedly deformed, so that wired patterns at both ends where the stress at the time of deformation tends to concentrate (in the first embodiment, the trigger wires 21*c*) may suffer minute cracks. And minute cracks may progress by the temperature rise of the wired pattern and lead to complete disconnection of the wired pattern. Since the temperature rise of the wired pattern occurs when a large current flows through the wired pattern, the possibility of progress of cracks is higher in the xenon wires 21*b* through which a larger current flows than in the trigger wires 21*c*.

Therefore, as shown in FIG. 5, in the entire communication portion 106 that deforms during the repeated operations of the strobe light emitting portion 6 for the stored state and the protruding state, the two xenon wires 21*b* through which a large current flows are arranged between the two trigger wires 21*c*, not at both ends of the flexible substrate 21 where cracks tends to be generated. This makes it possible to decrease the possibility of disconnection due to the progress of cracks.

As above, a configuration for decreasing the possibility of disconnection due to the progress of cracks in the wires has been described so far. However, decreasing the possibility of generation of cracks in the first place is also effective in decreasing the possibility of disconnection. Hereinafter, a configuration for decreasing the possibility of generation of cracks in the wires in the first embodiment will be described.

As shown in FIG. 4C, the insulating tape 26 having an unfolded shape as shown in FIG. 4A is wound around the communication portion 106 of the flexible substrate 21 to cover the communication portion 106. In order to reinforce the flexible substrate 21 and ensure the required pressure resistance, the rectangular portion of the insulating tape 26 is doubly wound around the communication portion 106 of the flexible substrate 21.

The insulating tape 26 has an extension portion 26*a* (FIG. 4A) that has a convex shape extending from one side of the rectangular shape. The extension portion 26*a* is attached so as to cover the bending portion 21*a* of the flexible substrate 21. That is, as shown in FIG. 4C, in a state where the insulating tape 26 is wound around the flexible substrate 21, the extension portion 26*a* is attached so as to protrude from the communication portion 106 of the flexible substrate 21 to the soldering portion 104.

As described above, bending stress repeatedly acts on the bending portion 21*a* which is the region between the solder 107 and the portion of the flexible substrate 21 moving in the front-back direction of the digital camera 1, which may cause cracks in the wired pattern on the flexible substrate 21. Therefore, as shown in FIGS. 4A to 4C, attaching the extension portion 26*a* of the insulating tape 26 to the bending portion 21*a* makes it possible to decrease the possibility of occurrence of cracks in the wired pattern of the flexible substrate 21. Details will be described later with reference to FIGS. 6A and 6B.

Figure 6A:
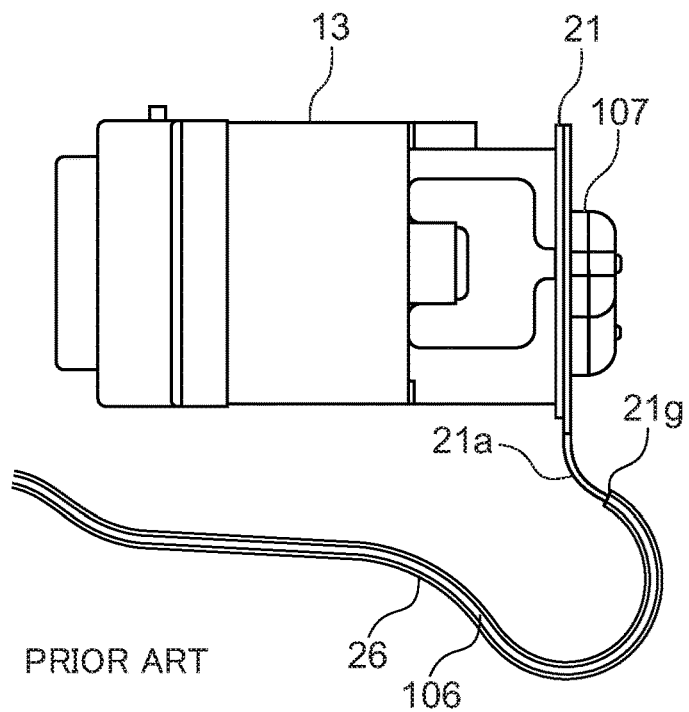
FIG. 6A is a side view of a Fresnel cover of the strobe light emitting portion, the flexible substrate, and an insulating tape after assembling in the case where the insulating tape has a conventional configuration without an extension portion.
Figure 6B:
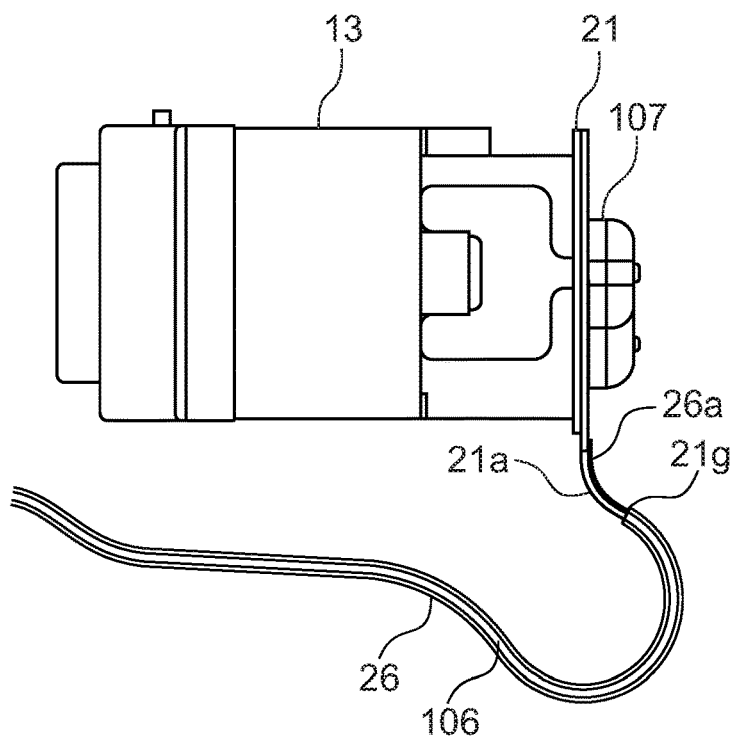
FIG. 6B is a side view of a Fresnel cover of the strobe light emitting portion, the flexible substrate, and an insulating tape after assembling in the case where the insulating tape has a configuration with an extension portion according to the first embodiment.

FIG. 6A is a side view of the Fresnel cover 13 of the strobe light emitting portion 6, the flexible substrate 21, and the insulating tape 26 after assembling in the case where the insulating tape 26 has a conventional configuration without the extension portion 26*a*. FIG. 6B is a side view of the Fresnel cover 13 of the strobe light emitting portion 6, the flexible substrate 21, and the insulating tape 26 after assembling in the case where the insulating tape 26 has a configuration with the extension portion 26*a* according to the first embodiment.

The insulating tape 26 is attached to the flexible substrate 21 in an unbent state as shown in FIG. 4C, and then the flexible substrate 21 is assembled into the state shown in FIGS. 6A and 6B.

In the flexible substrate 21, bending stress repeatedly acts on the bending portion 21*a* that is a region between the solder 107 and the portion of the flexible substrate 21 moving in the front-back direction of the digital camera 1 when the strobe light emitting portion 6 transitions from the stored state to the protruding state or from the protruding state to the stored state.

More specifically, as shown in FIG. 6A, in the conventional case where the insulating tape 26 does not have the extension portion 26*a*, the insulating tape 26 is doubly wound around only the communication portion 106 of the flexible substrate 21. On the other hand, the flexible substrate 21 is exposed on both sides of the bending portion 21*a*. Therefore, bending hardness greatly varies and local bending stress concentrates on a boundary portion 21*g*, which is the boundary between the communication portion 106 around which the insulating tape 26 is wound and the bending portion 21*a*.

On the other hand, as shown in FIG. 6B, in the case of the first embodiment in which the insulating tape 26 has the extension portion 26*a*, the insulating tape 26 is doubly wound around the communication portion 106 of the flexible substrate 21, and the extension portion 26*a* of the insulating tape 26 is attached in such a manner as to cover the boundary portion 21g. Therefore, the amount of change in bending hardness of the boundary portion 21g decreases as compared with the conventional case without the extension portion 26a, whereby the local bending stress applied to the boundary portion 21g is relaxed.

As described above, in the first embodiment, the insulating tape 26 is provided with the extension portion 26a, and the extension portion 26a is attached in such a manner as to overlap the bending portion 21a. This relaxes local stress applied to the boundary portion 21g, which can decrease the possibility of cracks occurring in the wired patterns on the flexible substrate 21.

Second Embodiment

Hereinafter, a second embodiment of the present invention will be described with reference to the drawings. A digital camera 1 according to the second embodiment has the same configuration as the digital camera 1 according to the first embodiment. Therefore, hereinafter, the same components as those in the first embodiment will be denoted by the same reference numerals, and redundant description will be omitted.

Similarly to the strobe light emitting portion unit 102 according to the first embodiment shown in FIGS. 2A and 2B, the strobe light emitting portion unit 102 according to the second embodiment has the strobe light emitting portion 6 that transitions between two states, a stored state and a protruding state.

Figure 7A:
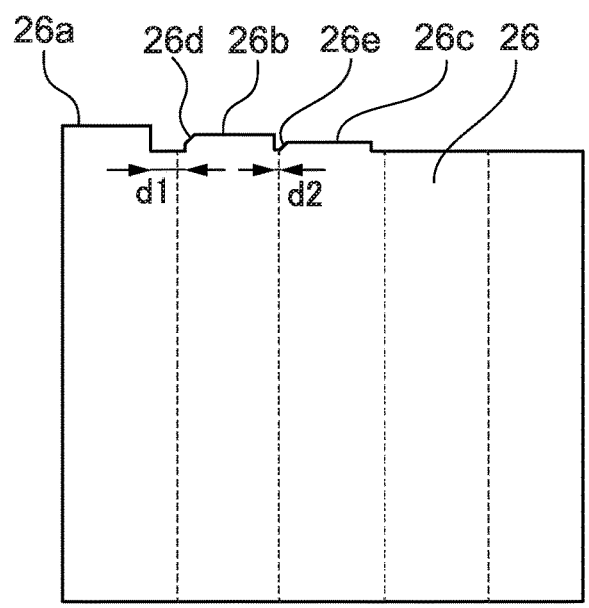
FIG. 7A is a front view of an insulating tape according to a second embodiment of the present invention.

The second embodiment is different from the first embodiment in that the insulating tape 26 has a plurality of extension portions 26a to 26c, the lengths of the extension portions 26a to 26c change stepwise, and some of the extension portions 26a to 26c have cutout portions 26d and 26e that are cut obliquely (see FIG. 7A).

Figure 7B:
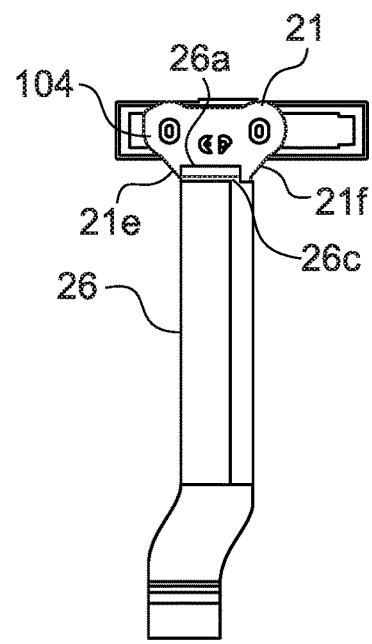
FIG. 7B is a front view of the state in which the insulating tape shown in FIG. 7A is attached to the flexible substrate.
Figure 7C:
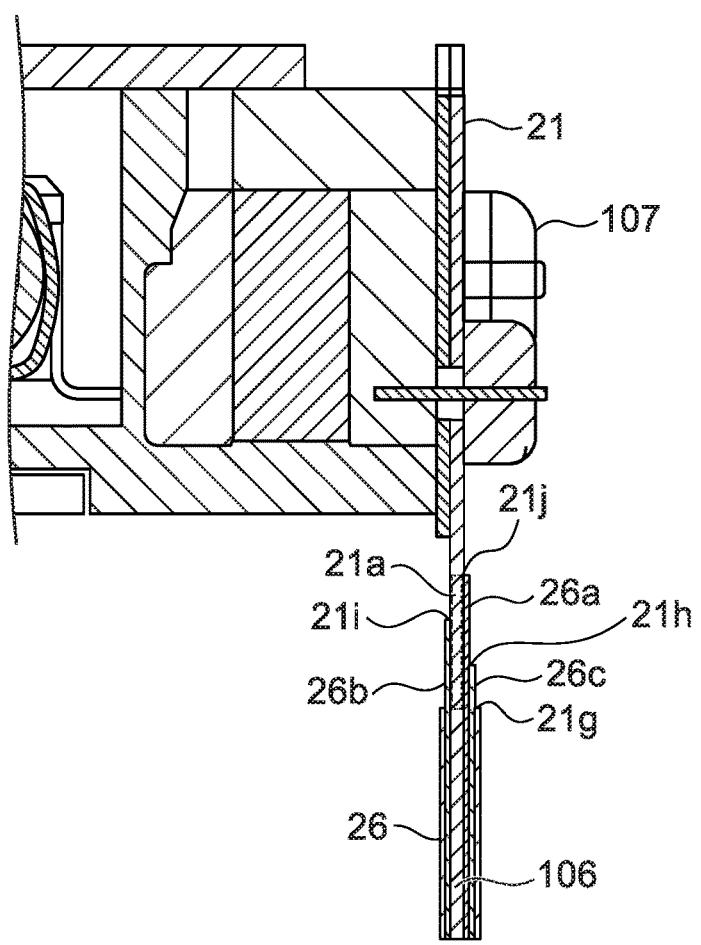
FIG. 7C is a cross-sectional view of the state in which the insulating tape shown in FIG. 7A is attached to the flexible substrate.

FIG. 7A is a front view of the insulating tape 26 according to the second embodiment of the present invention, FIG. 7B is a front view of a state where the insulating tape 26 is attached to the flexible substrate 21, and FIG. 7C is a cross-sectional view of a state where the insulating tape 26 is attached to the flexible substrate 21.

As shown in FIG. 7A, the insulating tape 26 has three extension portions 26a to 26c each having an independent convex shape and attached to the flexible substrate 21 in this order. With regard to the amount of extension from the insulating tape 26, the extension portion 26a has the largest amount, and the extension portion 26b and the extension portion 26c have amounts sequentially decreased in order. There is provided a distance d1 between the extension portion 26a and the extension portion 26b, and there is provided a distance d2 between the extension portion 26b and the extension portion 26c. Between the distances d1 and d2, there are portions that are mountain-folded when the insulating tape 26 is wound around the flexible substrate 21 and that are represented by dotted lines in FIG. 7A. Then, the extension portion 26b and the extension portion 26c respectively have cutout portions 26d and 26e obliquely cut at convex corners.

As shown in FIG. 7B, when the insulating tape 26 is wound around the flexible substrate 21, the extension portions 26a to 26c are sequentially attached to one of the front and back surfaces of the flexible substrate 21. As a result, the extension portion 26a and the extension portion 26c are attached to the back side of the digital camera 1, and the extension portion 26b is attached to the front side of the digital camera 1. That is, the amounts of extension of the extension portions 26a to 26c to the soldering portion 104 are gradually reduced in the order in which they are attached to the flexible substrate 21. The above-described cutout portion 26e of the extension portion 26c is shaped in such a manner as to avoid the connection shape 21e of the flexible substrate 21 on the locus of assembly. Thus, when the insulating tape 26 is wound around the flexible substrate 21, the extension portion 26c is not inadvertently stuck to the connection shape 21e, which results in improvement of the assemblability.

The extension portion 26b is attached to the flexible substrate 21 on the back side of the flexible substrate 21 (not shown in FIG. 7B). The above-described cutout portion 26d of the extension portion 26b is shaped in such a manner as to avoid the connection shape 21f of the flexible substrate 21 on the locus of assembly. For this reason, when the insulating tape 26 is wound around the flexible substrate 21, the extension portion 26b is not inadvertently stuck to the connection shape 21f, and the assemblability is improved.

As shown in FIG. 7C, the number of portions of the insulating tape 26 wound around the bending portion 21a of the flexible substrate 21 decreases stepwise from the communication portion 106 toward the solder 107. Specifically, in the direction from the communication portion 106 toward the solder 107, the number of portions decreases stepwise from five (the portions wound around the communication portion 106 of the insulating tape 26), three (the extension portions 26a to 26c), two (the extension portion 26a and 26b) and one (the extension portion 26a).

As described above, the amount of change in bending hardness at the boundary portion 21g is reduced as compared with the first embodiment, so that the local bending stress applied to the boundary portion 21g is further relaxed. Furthermore, as shown in FIG. 7C, in the bending portion 21a, the amounts of change in the bending hardness of the boundary portion 21h, the boundary portion 21i, and the boundary portion 21j where the insulating tape 26 less overlaps are reduced as compared with the first embodiment. This makes it possible to further decrease the possibility of cracks occurring in the wired patterns on the flexible substrate 21.

Other Embodiments

In the first and second embodiments, the two trigger input terminals 18 are disposed between the two xenon terminals 17 as viewed from the short-side direction of the communication portion 106, whereas the two xenon wires 21b need to be disposed between the two trigger wires 21c in the entire the communication portion 106. For this reason, the wires are replaced in the region where the reinforcement plate 100 of the flexible substrate 21 is attached. However, the wiring is not limited to that in the first and second embodiments as far as the two xenon wires 21b are arranged between the two trigger wires 21c in the entire communication portion 106. For example, the strobe light emitting portion unit 102 may be configured such that the two xenon terminals 17 are disposed between the two trigger input terminals 18 when viewed from the short-side direction of the communication portion 106. In this case, it is not necessary to replace the wires on the flexible substrate 21, thereby achieving miniaturization of the flexible substrate 21.

In the first and second embodiments, the flexible substrate 21 has no through hole. However, the flexible substrate 21 may be a flexible substrate including two or more wire layers having a through hole.

As above, the present invention has been described in detail based on preferred embodiments. However, the present invention is not limited to these specific embodiments but the present invention includes various modes without deviating from the scope of the present invention. For example, in the first and second embodiments, the strobe light emitting portion 6 is movable with respect to the main body portion 28 of the digital camera 1. However, the main body portion 28 may not have an imaging function as far as it can perform a strobe control. Moreover, each of the embodiments mentioned above merely shows one embodiment of the present invention, and these embodiments can be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-002704 filed Jan. 10, 2019 which is hereby incorporated by reference herein in its entirety.

What is claimed is:

1. A lighting device comprising:
a main body portion;
a light emitting portion movable relative to the main body portion;
a light emission control portion provided in the main body portion; and
a flexible substrate configured to electrically connect the light emitting portion and the light emission control portion,
wherein the light emitting portion comprises a xenon tube and a light emission control coil,
wherein the flexible substrate comprises (a) a soldering portion that is soldered to the light emitting portion at one end, (b) a connection portion that is connected to the light emission control portion at another end, (c) a communication portion that connects the soldering portion and the connection portion, and (d) four wires that are arranged in the communication portion in a longitudinal direction,
wherein the light emitting portion comprises (a) two xenon terminals that are connected to respective ends of the xenon tube, and (b) two light emission control terminals that are connected to the light emission control coil,
wherein the four wires are electrically connected by soldering to different terminals of the two xenon terminals and the two light emission control terminals in the soldering portion,
wherein, in the soldering portion, two first areas respectively soldered to the two light emission control terminals are arranged between two second areas respectively soldered to the two xenon terminals, when viewed from a short-side direction of the communication portion, and
wherein, in the communication portion, of the four wires, two second wires respectively electrically connected to different terminals of the two xenon terminals are arranged between, of the four wires, two first wires respectively electrically connected to different terminals of the two light emission control terminals.

2. The lighting device according to claim 1, wherein the communication portion is a portion that deforms in a process in which the light emitting portion moves relative to the main body portion.

3. The lighting device according to claim 1, wherein a plate-like reinforcement member is attached to the soldering portion, and
wherein the two second wires are arranged between the two first wires at a boundary of the reinforcement member facing the communication portion.

4. The lighting device according to claim 1, wherein a magnitude of a current flowing through the two first wires is smaller than a magnitude of a current flowing through the two second wires.

5. The lighting device according to claim 1, wherein a width of the two first wires is smaller than a width of the two second wires.

6. The lighting device according to claim 1, wherein the two light emission control terminals are arranged in a region between the two xenon terminals when viewed from the short-side direction of the communication portion.

7. The lighting device according to claim 1, wherein the light emission control coil is arranged in a region between both ends of the xenon tube when viewed from the short-side direction of the communication portion, and
wherein the two xenon terminals are arranged in a region between the two light emission control terminals.

8. A lighting device comprising:
a main body portion;
a light emitting portion movable relative to the main body portion;
a light emission control portion provided in the main body portion; and
a flexible substrate configured to electrically connect the light emitting portion and the light emission control portion,
wherein the flexible substrate comprises (a) a soldering portion that is soldered to the light emitting portion at one end, (b) a connection portion that is connected to the light emission control portion at another end, (c) a communication portion that connects the soldering portion and the connection portion and around which an insulating tape is wound in a short-side direction, and (d) a bending portion that bends when the light emitting portion moves relative to the main body portion,
wherein the insulating tape comprises an extension portion that extends to the soldering portion when being wound around the communication portion,
wherein the extension portion of the insulating tape is attached to the bending portion, and
wherein the insulating tape further comprises another extension portion that extends to the soldering portion,
wherein the extension portion and the another extension portion are formed in the insulating tape in independent convex shapes, and
wherein the extension portion and the another extension portion are sequentially attached to one surface of front and back sides of the flexible substrate in the bending portion.

9. The lighting device according to claim 8, wherein an unfolded shape of the insulating tape is formed by a square shape for covering the communication portion and the extension portion having a convex shape extending from one side of the square shape.

10. The lighting device according to claim 8, wherein extension amounts of the extension portion and the another extension portion to the soldering portion are reduced stepwise in an order in which the extension portion and the another extension portion are attached to the flexible substrate.

11. The lighting device according to claim 8, wherein at least one of the extension portion and the another extension portion has a cutout portion at a corner of the convex shape, and wherein the cutout portion is shaped in such a manner as to avoid a connection shape that continuously connects the soldering portion and the communication portion on a locus of assembly when the insulating tape is wound around the communication portion.

12. A flexible substrate comprising:

a soldering portion that is soldered to a light emitting portion at one end;

a connection portion that is connected to a light emission control portion at another end;

a communication portion that connects the soldering portion and the connection portion; and four wires that are arranged in the communication portion in a longitudinal direction, wherein the four wires are electrically connected by soldering to different terminals of two xenon terminals and two light emission control terminals in the soldering portion, wherein, in the soldering portion, two first areas respectively soldered to the two light emission control terminals in the light emitting portion are arranged between two second areas respectively soldered to the two xenon terminals in the light emitting portion, when viewed from a short-side direction of the communication portion, and wherein, in the communication portion, of the four wires, two second wires respectively electrically connected to different terminals of the two xenon terminals are arranged between, of the four wires, two first wires respectively electrically connected to different terminals of the two light emission control terminals.

13. A flexible substrate comprising:

a soldering portion that is soldered to a light emitting portion at one end;

a connection portion that is connected to a light emission control portion at another end;

a communication portion that connects the soldering portion and the connection portion and around which an insulating tape is wound in a short-side direction thereof; and a bending portion that bends when the light emitting portion moves relative to the light emission control portion, wherein the insulating tape comprises an extension portion that extends to the soldering portion when being wound around the communication portion, wherein the extension portion of the insulating tape is attached to the bending portion, and wherein the insulating tape further comprises another extension portion that extends to the soldering portion, wherein the extension portion and the another extension portion are formed in the insulating tape in independent convex shapes, and wherein the extension portion and the another extension portion are sequentially attached to one surface of front and back sides of the flexible substrate in the bending portion.

14. The flexible substrate according to claim 12, wherein the two first wires have a portion such that the two first wires extend from the respective two first areas in a direction away from the connection portion and then extend outside of the respective two second areas in the short-side direction of the communication portion.

* * * * *